United States Patent
Hegde et al.

(10) Patent No.: US 9,483,476 B2
(45) Date of Patent: Nov. 1, 2016

(54) SYSTEM DECOMMISSIONING THROUGH REVERSE ARCHIVING OF DATA

(71) Applicants: Sumanth Hegde, Bangalore (IN); Santosh V, Bangalore (IN)

(72) Inventors: Sumanth Hegde, Bangalore (IN); Santosh V, Bangalore (IN)

(73) Assignee: SAP SE, Walldorf (DE)

(*) Notice: Subject to any disclaimer, the term of this patent is extended or adjusted under 35 U.S.C. 154(b) by 451 days.

(21) Appl. No.: 13/855,711

(22) Filed: Apr. 3, 2013

(65) Prior Publication Data
US 2014/0304234 A1 Oct. 9, 2014

(51) Int. Cl.
*G06F 17/30* (2006.01)

(52) U.S. Cl.
CPC ... *G06F 17/30073* (2013.01); *G06F 17/30309* (2013.01)

(58) Field of Classification Search
CPC .................. G06F 17/30076; G06F 17/30123
USPC .......................................................... 707/661
See application file for complete search history.

(56) References Cited

U.S. PATENT DOCUMENTS

| | | | |
|---|---|---|---|
| 7,209,898 B2 | 4/2007 | Pfeiffer et al. | |
| 7,681,185 B2 | 3/2010 | Kapoor et al. | |
| 7,849,049 B2 | 12/2010 | Langseth et al. | |
| 7,899,841 B2 | 3/2011 | Otter et al. | |
| 7,979,793 B2 | 7/2011 | Miller et al. | |
| 8,117,165 B1 | 2/2012 | Winckelmann et al. | |
| 8,250,529 B2 | 8/2012 | Chawla et al. | |
| 8,352,432 B2 | 1/2013 | Prahlad et al. | |
| 8,407,215 B2 | 3/2013 | Sheedy et al. | |
| 8,522,195 B2 * | 8/2013 | Miloslavsky | G06F 8/10 717/104 |
| 8,560,568 B2 | 10/2013 | Gilder et al. | |
| 8,615,493 B2 | 12/2013 | Prahlad et al. | |
| 8,892,712 B2 * | 11/2014 | Kuchibhotla | 709/217 |
| 2007/0043954 A1 * | 2/2007 | Fox | G06F 21/34 713/185 |
| 2011/0029747 A1 * | 2/2011 | Schloemmer | G06F 11/1443 711/161 |
| 2011/0035359 A1 * | 2/2011 | Bendakovsky | G06F 11/1458 707/640 |
| 2011/0173346 A1 | 7/2011 | Neben | |
| 2012/0030180 A1 | 2/2012 | Klevenz et al. | |
| 2012/0221527 A1 * | 8/2012 | Huang | G06F 11/1448 707/654 |
| 2012/0221802 A1 * | 8/2012 | Huang | G06F 3/061 711/154 |
| 2012/0265744 A1 * | 10/2012 | Berkowitz | G06F 17/30873 707/705 |
| 2013/0036094 A1 * | 2/2013 | Fippel | G06Q 10/06 707/640 |
| 2013/0054492 A1 * | 2/2013 | Boudreau | G06Q 10/063 705/400 |
| 2013/0191328 A1 | 7/2013 | Hackmann et al. | |
| 2014/0040182 A1 * | 2/2014 | Gilder | G06F 17/30578 707/602 |
| 2014/0046936 A1 * | 2/2014 | John | G06F 17/30294 707/723 |
| 2014/0214494 A1 * | 7/2014 | Jadhav | G06Q 10/0637 705/7.36 |

OTHER PUBLICATIONS

Bui et al., ROARS: a robust object archival system for data intensive scientific computing, Aug. 14, 2012, 35 pages.*

* cited by examiner

*Primary Examiner* — Noosha Arjomandi

(57) ABSTRACT

In one embodiment, a source database table associated with a source system is received. Further, one or more fields of the received source database table are mapped with one or more fields in an archive file associated with a destination system using a pre-constructed template. One or more entries corresponding to the one or more fields of the source database table is generated in the archive file based on the mapped one or more fields. Furthermore, the source system is decommissioned upon generating the one or more entries in the archive file.

17 Claims, 5 Drawing Sheets

SYSTEM DECOMMISSIONING THROUGH REVERSE ARCHIVING OF DATA

FIELD

Embodiments generally relate to system decommissioning and more particularly to methods and systems to provide system decommissioning through reverse archiving of data.

BACKGROUND

Information technology landscapes and system architectures do not remain static. Acquisitions and divestitures are normal occurrences. During acquisition, a company has to deal with changes in its enterprise system landscape to include systems (e.g., systems of acquired company) supplied by different vendors of enterprise system. Thereby, the company tends to have a heterogeneous landscape of enterprise systems. On other hand, there are significant benefits in having homogeneous landscape of enterprise systems than having the heterogeneous landscape of enterprise systems for smoother operation of business. Therefore, consolidating systems and decommissioning legacy systems are carried out for simplifying the system landscape, and to reduce license cost and maintenance costs.

However, the process of decommissioning systems impacts existing processes, master data management across applications, metadata management across systems and naming standards that vary between different applications. The existing process of system decommissioning involves high levels of project risk in terms of costs and time as there is no generic way lo adapt data from the legacy system to another system before decommissioning the legacy system. For example, Enterprise Resource Planning (ERP) systems offering system support to processes like production planning sales and distribution, finance, human resource management and the like handles very critical functionalities for the company and hence implementing ERP (e.g., adapting an off the shelf ERP product to the company needs and processes) is often a challenging and critical activity for the organization.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to provide system decommissioning through reverse archiving of data are described herein. According to various embodiments, system decommissioning is a process of withdrawing systems (e.g., source systems which are not in use anymore) in a landscape of enterprise systems upon transferring or migrating data associated with the systems into another system (e.g., destination system). Further, system decommissioning involves converting format or semantics of the data associated with the source systems into a format or semantics followed in the destination system. Further, data represent values of qualitative or quantitative variables, belonging to a set of items. Data in computing (or data processing are represented in a structure, often tabular (e.g., represented by rows and columns), a tree (e.g., a set of nodes with parent-children relationship) or a graph structure (e.g., a set of interconnected nodes).

In one embodiment, a database table (e.g., tabular data) of the source system is read. Further, one or more fields of the received source database table is mapped with one or more fields in an archive file associated with the destination system using a pre-constructed mapping table. The pre-constructed mapping table or template includes a look up table for semantics of the archive file corresponding to the source database table. Based on the mapped one or more fields, one or more entries corresponding to the one or more fields of the source database table is generated in the archive file and then the source system is decommissioned.

Further, the data associated with the source system can be easily read through the destination system for various purposes (e.g., Enterprise Resource Planning (ERP) purpose, Information Lifecycle Management (ILM) purpose, and the like). Since the data associated with the Source system is first stored in the archive file of the destination system and then used by the destination system, the process is referred as reverse archiving. Furthermore, since the data associated with the source system is stored in the destination system as per the semantics of the destination system using the pre-constructed mapping table, the data management across applications, metadata management across systems and naming standards complexity are avoided with reduced project cost, time and impact to the existing processes.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Figure 1:
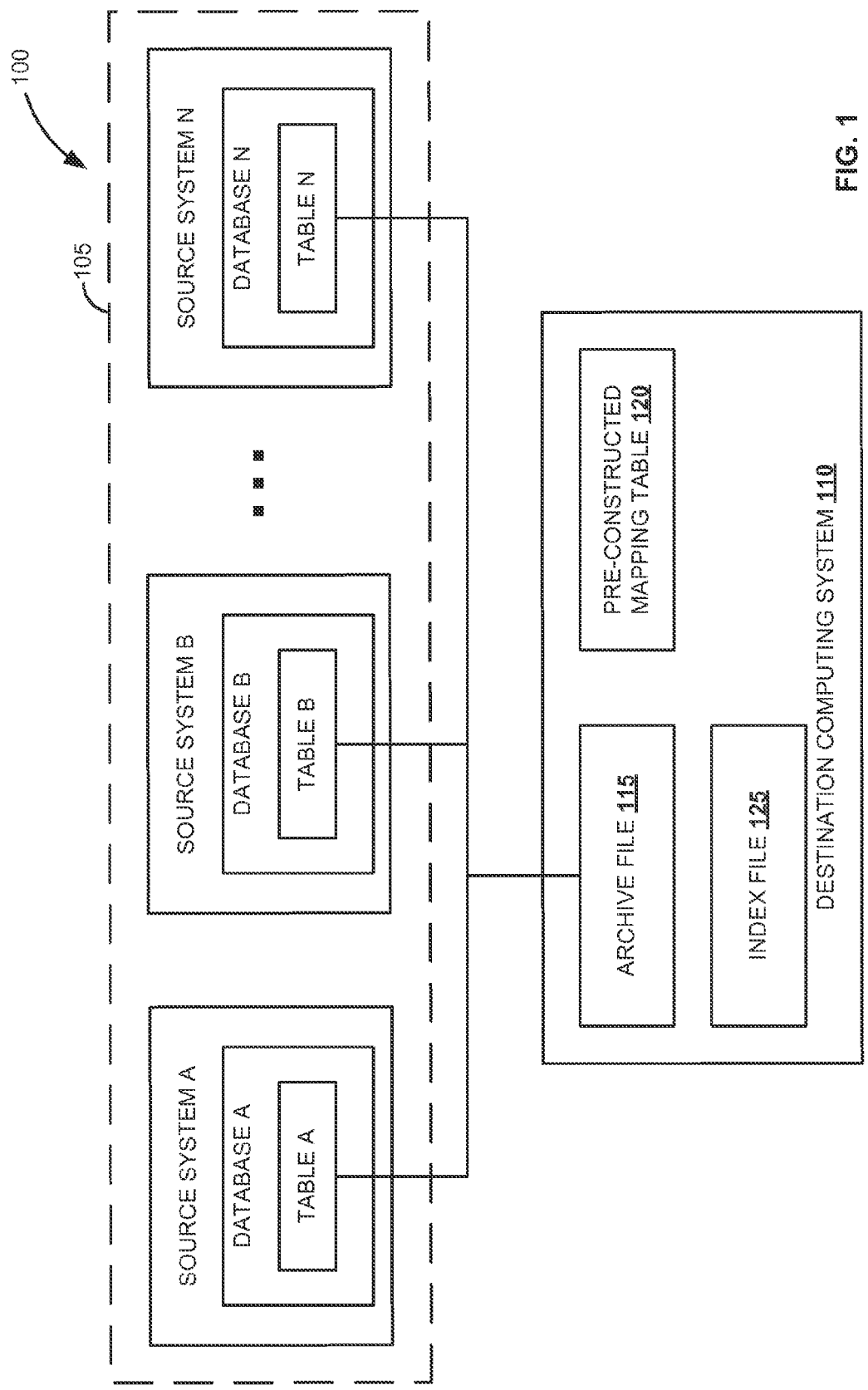
FIG. 1 is a block diagram illustrating system decommissioning through reverse archiving of data, according to an embodiment.

FIG. 1 is a block diagram 100 illustrating system decommissioning through reverse archiving of data, according to an embodiment. The block diagram 100 includes one or more source computing systems 105 (e.g., source systems A to N) and a destination computing system 110. In one exemplary embodiment, the source computing systems 105 and the destination computing system 110 are heterogeneous systems following different semantics to store data. The source computing systems 105 (e.g., source systems A to N) are decommissioned upon migrating data (e.g., tables A to N) associated with the source computing systems 105 (e.g., source systems A to N) to the destination computing system 110.

In one embodiment, the data (e.g., tables A to N) received from the source computing systems 105 (e.g., source systems A to N respectively) are stored in an archive file 115 of the destination computing system 110 upon converting semantics or format of the data (e.g., tables A to N) as per the semantics of the archive file 115 using a pre-constructed mapping table 120. The pre-constructed mapping table 120, also referred as template, includes look up tables for semantics of a database table in the archive file 115 corresponding to the tables A to N. In other words, the pre-constructed mapping table 120 understands the data format between the database semantics of the source computing systems 105 and the archive file 115. The pre-constructed mapping table 120 is described in greater detail in FIG. 4, and the method of storing data in the archive file is described with an example in FIGS. 2 and 3.

Further, an index file 125 of the destination computing system 110 is updated with metadata corresponding to the stored data (e.g., tables A to N) in the archive file 115. Furthermore, using the metadata, the data (e.g., tables A to N) can be retrieved from the archive file 115 for various purposes by an Enterprise Resource Planning (ERP) process, Information Lifecycle Management (ILM) process, and the like. For example, the ILM provides functionality to maintain compliant archiving and also provides a functionality to load data from the archive files with pre-delivered queries for different purposes such as auditing and so on. The ERP provides support to processes like production planning, sales and distribution, finance and human resource management by retrieving the data from the archives. Thus the metadata management across systems is achieved. Also, since the data is stored first in the archive file and then used by the destination system, the process is referred as reverse achieving.

Figure 2:
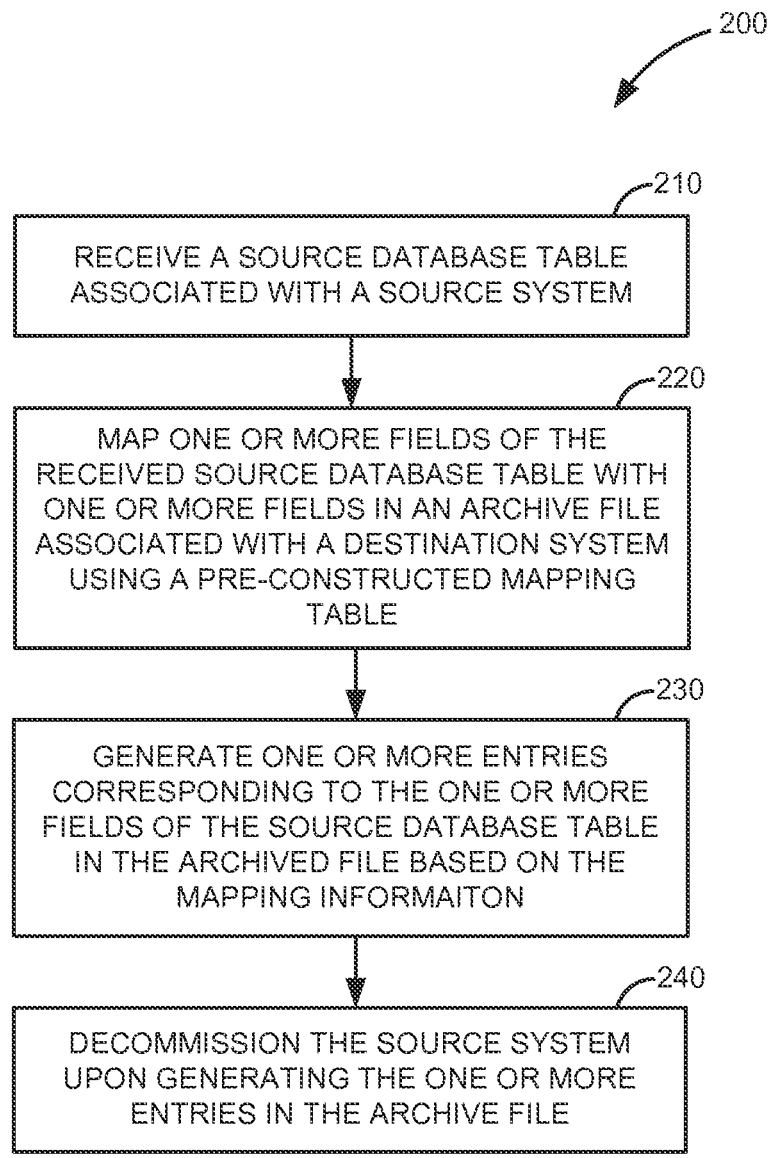
FIG. 2 is a flow diagram illustrating a method to provide system decommissioning through reverse archiving of data, according to an embodiment.
Figure 3A:
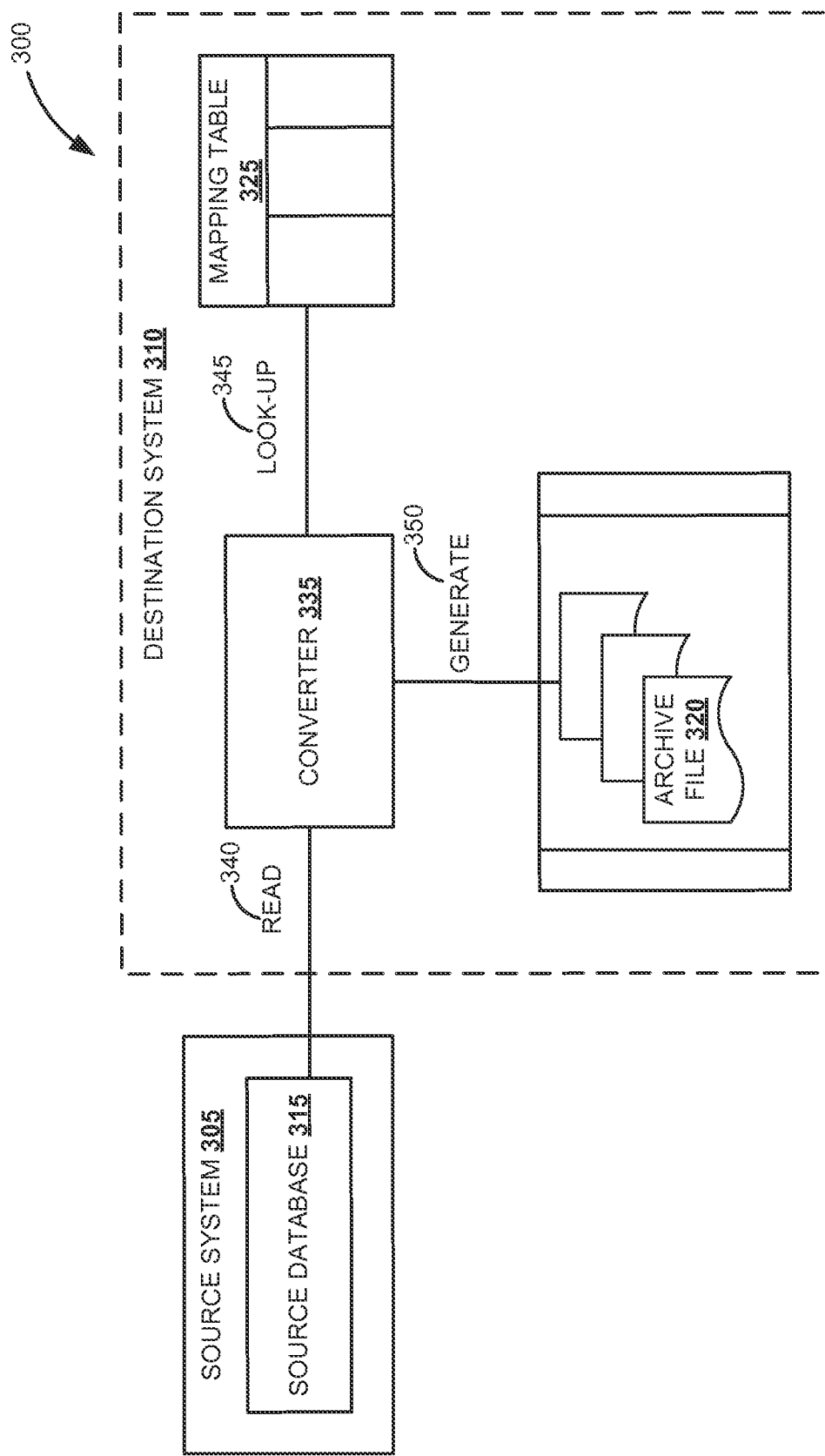
FIG. 3A is a block diagram illustrating the method of FIG. 2, according to an embodiment.

FIG. 2 is a flow diagram 200 illustrating a method to provide system decommissioning through reverse archiving of data, according to an embodiment. Further, FIG. 3A is a block diagram 300 illustrating a method of FIG. 2, according to an embodiment. In one exemplary embodiment, a source system 305 and a destination system 310 are heterogeneous systems having different semantics to store data. At process block 210, a source database table (e.g., database table of a source database 315) associated with the source system 305 is received. For example, the source database table 'FIN_ MASTER' of the source system 305 is read (e.g., step 340 of FIG. 3).

At process block 220, one or more fields of the received source database table are mapped with one or more fields in an archive file 320 associated with a destination system 310 using a pre-constructed mapping table 325. In one exemplary embodiment, the pre-constructed mapping table includes a look up table for semantics of the archive file 320 corresponding to the source database table. The look up is done from the mapping table 325 to map each table and field of the source system 305 to the corresponding archive object, table and field associated with the destination system 310. Further, semantics of the fields of the received source database table is converted as per the semantics of the fields in the archive file 320 by a converter 335.

Figure 3B:
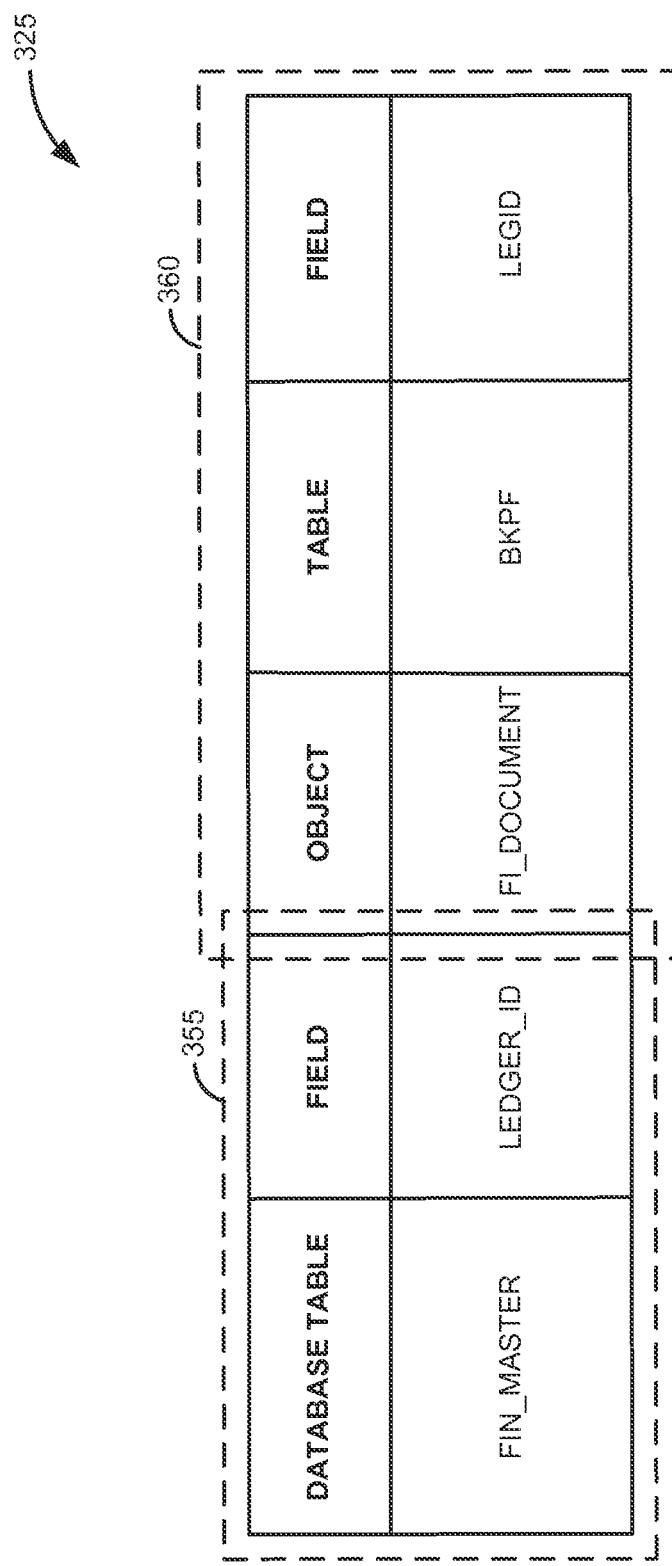
FIG. 3B is a block diagram illustrating an exemplary mapping table used for system decommissioning, according to an embodiment.

An exemplary pre-constructed template 325 is shown in FIG. 3B. The pre-constructed mapping table 325 includes semantic mapping information of the source database table and the archive file 320. The data semantics of the source database table is shown as 355 in FIG. 3B (e.g., 'database table' and 'field' associated with the source database table) and the data semantics of the archive file 320 is shown as 360 in FIG. 3B (e.g., 'object', 'table' and 'field' associated with the archive file 320). It is advantageous that the mapping table can be reused for different project (e.g., adapting different source system to the destination system) with minor or with no change, and also the mapping table can be imported by another destination system having same semantics of the destination system for which the mapping table exist. In one exemplary embodiment, attributes of the mapping table is automatically retrieved from the respective database table and the archive file, and is mapped as desired by a user.

For example, a field 'LEDGER_ID' of the source database table 'FIN_MASTER' is read. Further, corresponding 'object', 'table' and 'field' of the archive file is looked for mapping. Accordingly, the field 'LEGID' under the table 'BKPF' of the object TI_DOCUMENT' is looked up and mapped with the field 'LEDGER_ID' of the source database table 'FIN_MASTER'. Thereby, using the pre-constructed mapping table 325, the field in the source database field is easily mapped with the field in the archive file 320.

At process block 230, one or more entries corresponding to the one or more fields of the source database table are generated in the archive file based on the mapped one or more fields. Further, generating the entries include storing the fields of the source database table in the corresponding fields of the archive file. For example, the field 'LEDGER_ID' of the source database table 'FIN_MASTER' is stored in the archive file 320 as per the semantics of the archive file 320 (e.g., the field 'LEDGER_ID' of the source database table 'FIN _MASTER' is entered in the archive file 320 under 'FI_DOCUMENT', 'BKPF' and 'LEGID' in the archive file 320). At process block 240, the source system is decommissioned upon generating the one or more entries in the archive file.

In one embodiment, an index file of the destination system is updated with metadata corresponding to the generated one or more entries to provide access to the one or more entries from the destination system. In other words, the metadata of the archiving is manipulated in such a way that the data from the decommissioned system appear as normal archive file in the destination system 310. Further, the archive file is accessed by the destination system 310 using the index file.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface), These first and second computer systems can be configured in a server-client, peer-to-peer, or sonic other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
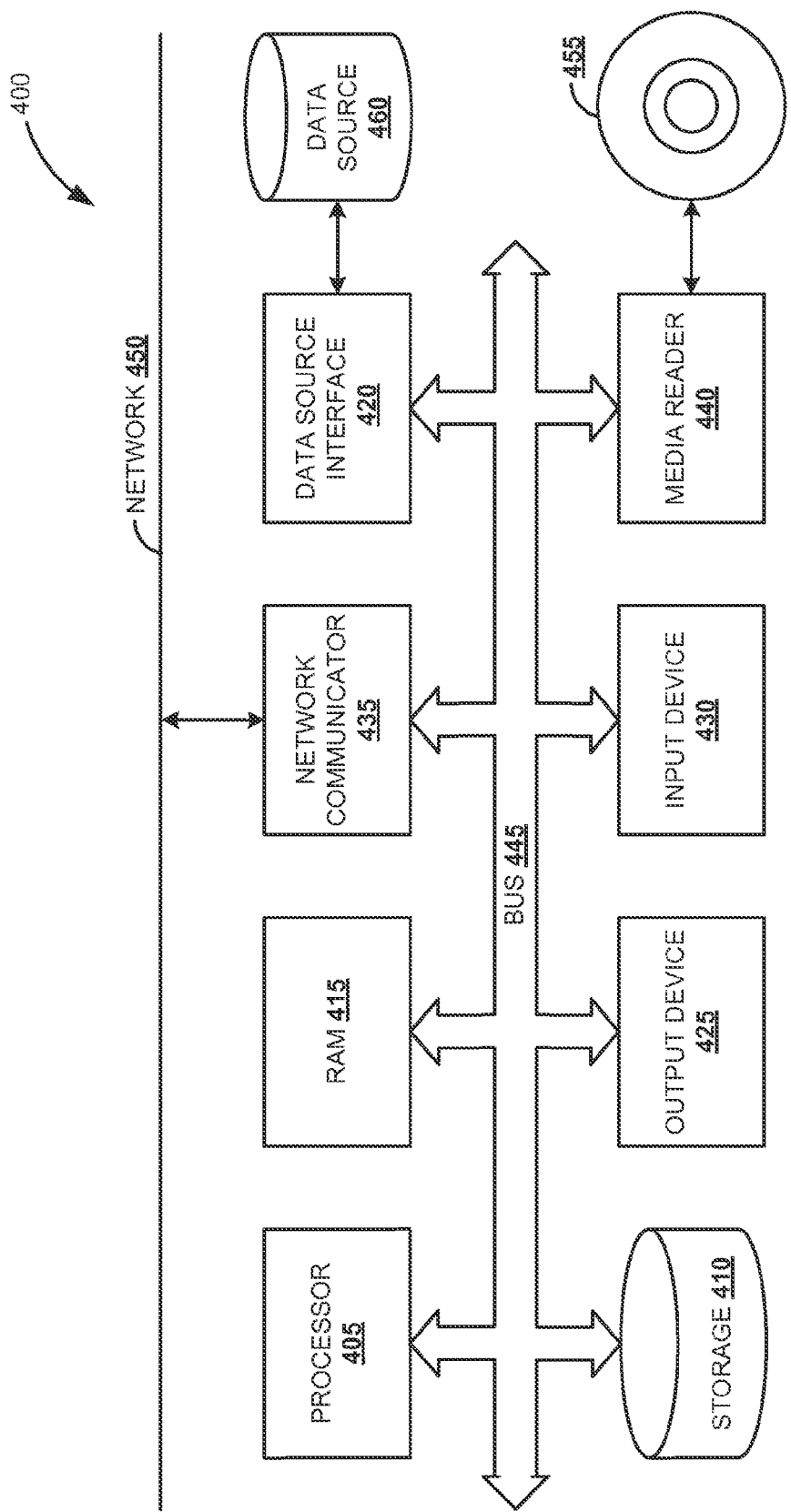
FIG. 4 is a block diagram of an exemplary computer system, according to an embodiment.

FIG. 4 is a block diagram of an exemplary computer system 400. The computer system 400 includes a processor 405 that executes software instructions or code stored on a computer readable storage medium 455 to perform the above-illustrated methods. The processor 405 can include a plurality of cores. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. According to some embodiments, such as some in-memory computing system embodiments, the RAM 415 can have sufficient storage capacity to store much of the data required for processing in the RAM 415 instead of in the storage 410. In some embodiments, all of the data required for processing may be stored in the RAM 415. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data Sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed cause a computer system to:
   receive a source database table associated with a source system;
   map one or more fields of the received source database table with one or more fields in an archive file associated with a destination system using a pre-constructed mapping table, wherein the pre-constructed mapping table comprises a look up table for semantics of the archive file corresponding to the source database table;
   generate one or more entries corresponding to the one or more fields of the source database table in the archive file based on the mapped one or more fields; and
   decommission the source system upon generating the one or more entries in the archive file.

2. The non-transitory computer-readable medium of claim 1, further comprising:
  update an index file of the destination system with metadata corresponding to the generated one or more entries to provide access to the one or more entries.

3. The non-transitory computer-readable medium of claim 2, wherein the archive file is accessed by the destination system using the index file.

4. The non-transitory computer-readable medium of claim 1, wherein the source system and the destination system are heterogeneous systems having different semantics to store data.

5. The non-transitory computer-readable medium of claim 1, wherein mapping the one or more fields of the received source database table with the one or more fields in the archive file comprises converting semantics of the one or more fields of the received source database table corresponding to semantics of the one or more fields in the archive file using the pre-constructed mapping table.

6. The non-transitory computer-readable medium of claim 1, wherein generating the one or more entries further comprises storing the one or more fields of the source database table in the corresponding one or more fields of the archive file.

7. A computer implemented method to provide system decommissioning through reverse archiving of data, the method comprising:
  receiving a source database table associated with a source system;
  mapping one or more fields of the received source database table with one or more fields in an archive file associated with a destination system using a pre-constructed mapping table, wherein the pre-constructed mapping table comprises a look up table for semantics of the archive file corresponding to the source database table;
  generating one or more entries corresponding to the one or more fields of the source database table in the archive file based on the mapped one or more fields; and
  decommissioning the source system upon generating the one or more entries in the archive file.

8. The computer implemented method of claim 7, further comprising:
  update an index file of the destination system with metadata corresponding to the generated one or more entries to provide access to the one or more entries.

9. The computer implemented method of claim 8, wherein the archive file is accessed by the destination system using the index file.

10. The computer implemented method of claim 7, wherein the source system and the destination system are heterogeneous systems having different semantics to store data.

11. The computer implemented method of claim 7, wherein mapping the one or more fields of the received source database table with the one or more fields in the archive file comprises converting semantics of the one or more fields of the received source database table corresponding to semantics of the one or more fields in the archive file using the pre-constructed mapping table.

12. The computer implemented method of claim 7, wherein generating the one or more entries further comprises storing the one or more fields of the source database table in the corresponding one or more fields of the archive file.

13. A system to provide system decommissioning through reverse archiving of data, the system comprising:
  at least one source system; and
  a destination system, comprising:
    at least one processor; and
    one or more memory devices communicative with the at least one processor, wherein the one or more memory devices store instructions to:
      receive a source database table associated with the source system;
      map one or more fields of the received source database table with one or more fields in an archive file associated with the destination system using a pre-constructed mapping table, wherein the pre-constructed mapping table comprises a look up table for semantics of the archive file corresponding to the source database table;
      generate one or more entries corresponding to the one or more fields of the source database table in the archive file based on the mapped one or more fields; and
      decommission the source system upon generating the one or more entries in the archive file.

14. The system of claim 13, further comprising:
  update an index file of the destination system with metadata corresponding to the generated one or more entries to provide access to the one or more entries.

15. The system of claim 14, wherein the archive file is accessed by the destination system using the index file.

16. The system of claim 13, wherein the source system and the destination system are heterogeneous systems having different semantics to store data.

17. The system of claim 13, wherein generating the one or more entries further comprises storing the one or more fields of the source database table in the corresponding one or more fields of the archive file.

* * * * *